INVENTORS
Dale H. Reed
Henry F. Dunlap
Thomas S. Hutchinson
Robert E. McCallum
William C. Pritchett Attorney INVENTORS
Dale H. Reed
Henry F. Dunlap
Thomas S. Hutchinson
Robert E. McCallum
William C. Pritchett BY *Bucher & Sharp*

Attorney

July 23, 1968  D. H. REED ET AL  3,394,256
METHOD OF CALIBRATING THE SCINTILLATION DETECTOR OF A
CHLORINE LOGGING SYSTEM
Filed July 21, 1964  3 Sheets-Sheet 3
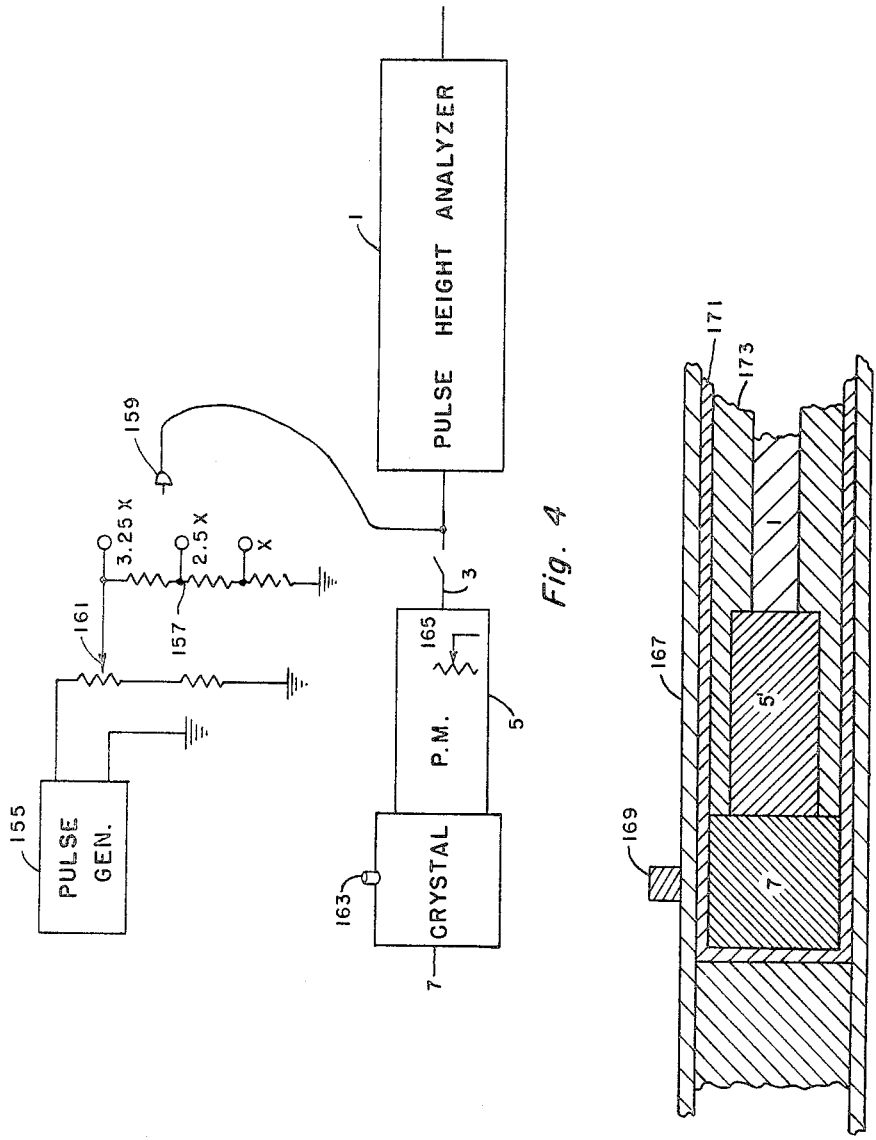
*INVENTORS*
Dale H. Reed
Henry F. Dunlap
Thomas S. Hutchinson
Robert E. McCallum
William C. Pritchett
BY *Blucher & Sharp*
Attorney United States Patent Office 3,394,256
Patented July 23, 1968

3,394,256
METHOD OF CALIBRATING THE SCINTILLATION DETECTOR OF A CHLORINE LOGGING SYSTEM
Dale H. Reed, Henry F. Dunlap, Thomas S. Hutchinson, Robert E. McCallum, and William C. Pritchett, Dallas, Tex., assignors to Atlantic Richfield Company, a corporation of Pennsylvania
Continuation-in-part of application Ser. No. 248,333, Dec. 31, 1962. This application July 21, 1964, Ser. No. 384,202
5 Claims. (Cl. 250—71.5)

This application is a continuation-in-part application of copending application, Ser. No. 248,333, filed Dec. 31, 1962, now U.S. Patent 3,264,475, which application is in turn a continuation-in-part application of copending application, Ser. No. 183,960, filed Mar. 30, 1962, now abandoned.

The present invention relates to an improved chlorine logging system. Specifically, the invention relates to an improved method of calibrating a chlorine logging system. More specifically, the invention relates to a method for calibrating a photomultiplier used as part of a downhole electronic system designed to scan the portion of the prompt capture gamma ray spectrum most sensitive to chlorine and to simultaneously scan a portion of the spectrum dependent on hydrogen content.

Basically, the chlorine log is produced by bombarding a subsurface formation with fast neutrons and measuring the formation's response in terms of prompt gamma rays of capture in a given energy range. Formation fluids, well bore fluids and certain elements in the formation moderate the fast neutrons until they reach thermal energy. At this energy, the neutrons are subject to capture by various atoms making up the formation. As a result of such captures, gamma rays are emitted and their energies are characteristic of formation elements performing the capture. Therefore, since chlorine is a principal capturer because of its large thermal neutron capture cross section, the formation's chlorine content can be determined by logging the count of gamma rays with energies characteristic of chlorine. This chlorine content, together with a conventional hydrogen content (neutron) curve, recorded separately or simultaneously, are conventionally referred to as a chlorine log. Since the hydrogen content or neutron curve is diagnostic of formation porosity and the chlorine curve is diagnostic of chlorine content, the log can be used to determine if porous formations contain salt water. That is, if the neutron curve registers a porous formation and the chlorine curve registers a small gamma ray count in the energy range most affected by chlorine, then the formation apparently contains hydrogen (water or oil) but little salt. If the depth of the formation rules out the presence of fresh water, oil is indicated.

Although chlorine logging is not restricted in its operation, it is particularly well suited to locating new producing formations during workover operations or in wells located in depleted reservoirs. In most instances, reservoirs nearing depletion are located in old producing areas where original unsophisticated well logs and other data are inadequate or have been lost or destroyed. Prior to the advent of the chlorine log, the wells in such areas were usually shut-in and abandoned since the producing casing prevented the use of electrical or sonic logs to aid in locating valuable new producing formations.

Although the chlorine log shows great potential in locating new producing formations in case boreholes, many serious problems still confront the present state of the art. Some of these problems include:

(1) The over-all log is by nature limited to shallow depths of investigation and therefore borehole effects seriously interfere with count rate. Some of the more serious borehole conditions include iron casing and casing centralizers, borehole fluid, nonuniform cement jobs, variation of borehole size with change in depth, variation of drilling fluid depth of invasion, variation in position of sonde with formation logged which in turn is dependent on variation of position of casing within a borehole.

(2) The log is continually faced with changes in the chemical composition of formations. This can be one of the most serious problems and frequently produces curves misleading or ambiguous in nature. As an example, shale or shaly streaks in sand can falsely indicate salt water as an oil zone. In formations where limestone grades into dolomite or where cement behind casing is not uniform a log response is obtained which can erroneously be interpreted as oil.

(3) Gas-bearing formations may often be difficult to differentiate from tight salt water sands.

(4) The source and detectors utilized by the log introduce statistical variations.

(5) Gamma ray emission peaks from silicon in sand, aluminum in shale, calcium in limestone and dolomite, iron in well casing, calcium in cement jobs, gives emission peaks in the same energy ranges as chlorine.

To fully appreciate the varying effects these problems can have on locating petroliferous deposits with a chlorine log it is necessary to understand how subsurface geological formations can vary throughout different parts of the country. As an example, "soft-rock" country such as the lower Gulf Coast and "hard-rock" country such as West Texas are areas containing oil-producing formations and other subsurface formations that differ greatly in their chemical and physical characteristics.

The lower Gulf Coast contains a weathered layer of heavy soils and a relatively shallow water table. The subsurface formations are generally a series of soft shales with poorly consolidated sandstones.

The West Texas area contains a weathered layer in which caliche is common and the water table is relatively deep. The subsurface formations are a series of shales, limestone, dolomite and evaporites with indurated sandstone. These rocks are older, denser and harder than the equivalent types of rocks in the lower Gulf Coast and therefore are, as a rule, less porous.

In the limestone reservoirs and even in the indurated sandstone reservoirs in West Texas the difference between salt water and oil is less discernible than in the Gulf Coast area. This is due primarily to the decrease in porosity and the resulting decrease in chlorine in the West Texas reservoirs. In other words, in West Texas reservoirs, the difference between salt and fresh water on the chlorine curve is evidenced by a smaller difference in relative count rate between the chlorine and hydrogen responses for a given salinity.

With the above differences in mind, let us now examine the enumerated problems faced by the chlorine logging operation and see how they vary from soft-rock areas to hard-rock areas.

(1) If formation fluid redistribution is allowed before logging operations are conducted, borehole conditions are approximately the same in both soft- and hard-rock country. The response of the tool to these conditions depends on formation conditions that vary in soft- and hard-rock areas.

(2) The problems caused by formations changing chemical compositions are generally aggravated in hard-rock country. That is, the response to chemical changes superimposed on the reduced response to salinity changes in hard-rock country aggravates the problem of detecting hydrocarbons. In the case of limestone grading into dolomite, the reduced calcium content in dolomite reduces the number of neutron captures by calcium. Since many of the calcium gamma rays are in the chlorine gamma range, dolomitization thus produces a false indication of an oil-bearing formation. The presence of shale in any type of structural formation produces a lower count rate giving a false count rate reading to a formation actually containing salt water. That is, the presence of hydrogen with little salt in the shale increases neutron moderation and therefore decreases the amount of gamma rays actually reaching the detector. The chlorine count is particularly decreased. In the less porous formations, the above-described smaller difference between salt water and oil further emphasizes the false indication produced by shale (3) The presence of gas in any type of producing formation often produces an indication deceptively close to an indication produced by the presence of salt water in tight or low porosity sand. That is, the greatly reduced hydrogen content in the gas (as compared to given volumes of water or oil) reduces neutron moderation thereby producing higher count rates on the hydrogen and on the chlorine curves. In a tight salt water zone the low hydrogen content can yield an identical high count rate on the hydrogen curve and a near identical count rate on the chlorine curve. Therefore, in limestone reservoirs of the hard-rock country, the anomalously high response due to calcium makes the detection of any difference between the two more difficult.

(4) Statistical errors introduced by variations in the source are more serious for the low count rates measured in high porosity formations and therefore more serious in soft-rock country than in hard-rock country.

(5) Interfering gamma ray emission peaks from elements other than chlorine increase as the logging operations are moved to hard-rock country. The difficulty stems mainly from the considerable overlap of the calcium spectrum and the chlorine spectrum, calcium being a more serious problem than the silicon in soft-rock country. Calcium is considerably more prevalent in West Texas than in the Gulf Coast. Sulfur, gypsum and magnesium are also troublesome and are more prevalent in West Texas.

The chlorine logging method has been practiced in various ways in an attempt to successfully distinguish between salt water and oil under varying conditions such as described above. However, to the best of applicants' knowledge, there is no tool or method presently available that can actually operate satisfactorily except under the most favorable borehole conditions, i.e., in shale-free sands of high porosity with high salinity formation waters.

Even under these favorable conditions the operation of the present-day tools does not always give strong indications of hydrocarbon-bearing formations. This is due in part to the fact that heretofore, no calibration method has been available to establish a repeatable accurate environment for calibrating the various chlorine logging systems in the field.

Accordingly, it is an object of the invention to provide an improved method and means for conducting chlorine logging operations whereby salt water can be distinguished from fresh water under varying conditions.

Another object of the present invention is to provide for an improved method and means for calibrating radioactive logging systems.

Another object of the present invention is to provide an improved calibrating method and a means that produces an accurate, repeatable calibrating environment and is simple to utilize in the field.

Another object of this invention is to provide an improved method and means for calibrating the photomultiplier tube in a system for detecting prompt capture gamma rays.

Another object of this invention is to provide an improved method and means for calibrating a chlorine logging detection system which method can be repeated immediately after a log is run to determine whether the calibration has changed.

Another object of this invention is to provide an improved method and means for checking the validity of a log obtained by bombarding surface formations with fast neutrons.

Other and further objects of the instant invention will be apparent from the following detailed description of the present invention.

The general arrangements and the other objects of the invention may be more readily determined by referring to the drawings wherein:

FIGURES 4 and 5 show calibration operations.

Applicants have conducted extensive research and experimentation in an attempt to produce a chlorine logging method and apparatus that can operate successfully and dependably regardless of formation and borehole conditions. As a result of these activities, applicants have discovered the critical portion of the prompt capture gamma ray energy spectrum which is most sensitive to chlorine and is contrary to the prior art teachings. Use of this portion of the spectrum unexpectedly overcomes recognized chlorine logging problems as well as certain other problems which applicants have discovered as serious obstacles to the operation of the prior art. See application, Ser. No. 183,960, filed Mar. 30, 1962, and application, Ser. No. 248,333, filed Dec. 31, 1962, for details not presently covered.

Briefly described, applicants' over-all invention contemplates a chlorine logging operation utilizing a critical window width to scan the prompt capture gamma ray energy spectrum so as to overcome the prior art disadvantages as well as the problems confronting chlorine logging as discovered by applicants. The invention further contemplates the use of a novel and simplified pulse height analyzer designed to pass prompt capture gamma ray energy in the critical 5 to 6.5 mev. range or in the mev. range desired. The pulse height analyzer and its novel discriminator units simplify the telemetering problem by using single polarity pulses to transmit neutron and chlorine data uphole with the two being distinguished by amplitude difference. Additional improvements are made in the over-all chlorine logging operation by using a single crystal photomultiplier detector in conjunction with the novel downhole multichannel pulse height analyzer. During chlorine logging operations, the single detector detects a first sample representative of total number of prompt capture gamma rays above a predetermined energy level emitted from the logged formation by the capture of thermal neutrons by all nuclei in the formation and a second sample representative of total number of prompt capture gamma rays in a predetermined energy range, which range is most affected by the gamma rays emitted from the capture of thermal neutrons by chlorine. The downhole pulse height analyzer selectively separates the first sample from the second sample and sends the results uphole on a single conductor.

Now, by the present application, applicants have disclosed and claimed still another improvement for a chlorine logging system, i.e., a new calibration method. This novel method will be presented and discussed with reference to applicants' novel chlorine logging apparatus. It is to be understood, however, that the calibration method shown herein is general and can be used equally to calibrate other detector systems.

Figure 1:
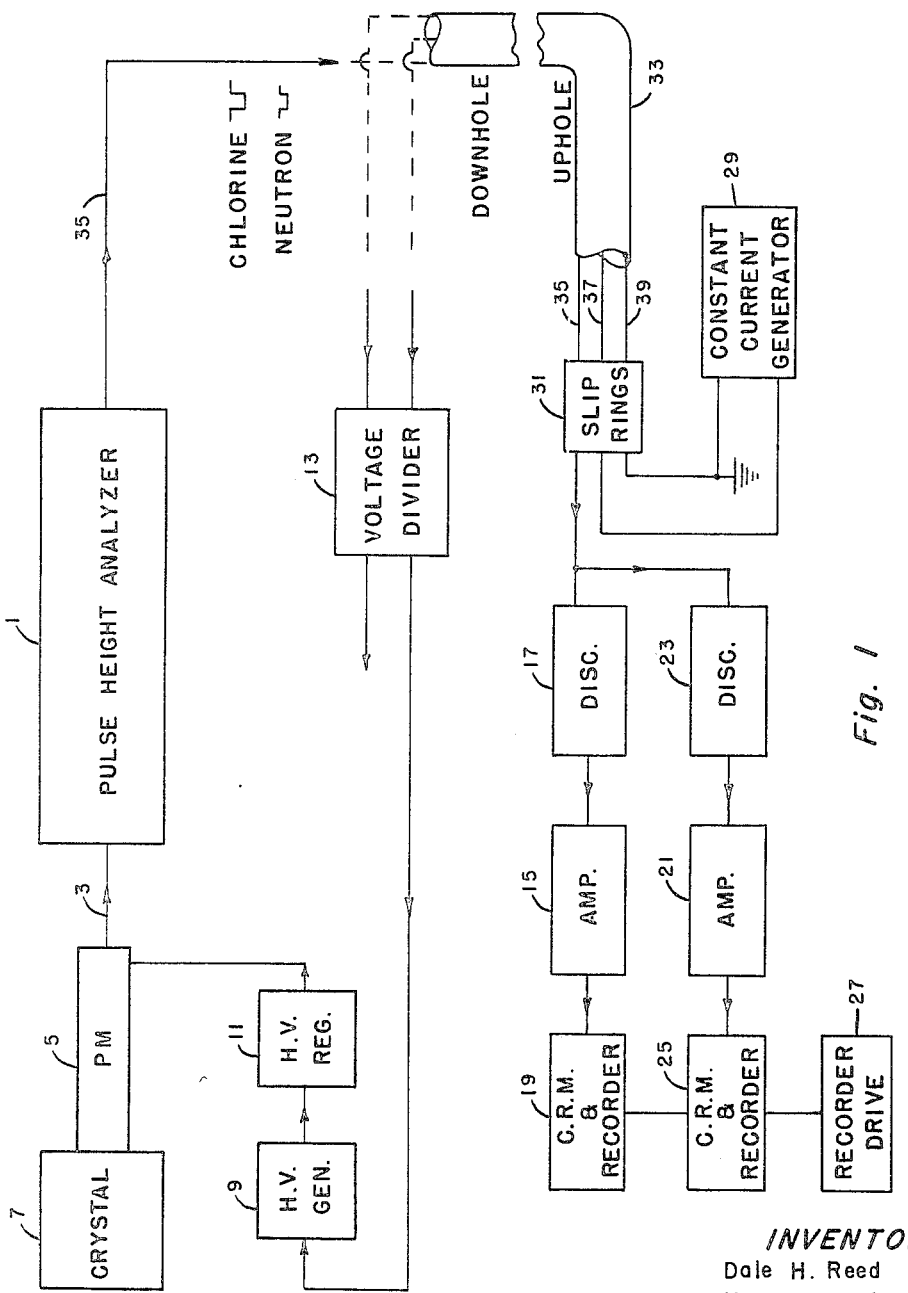
FIGURE 1 shows a block diagram of a logging instrument suitable for carrying out applicants' invention.

Consider now devices for practicing the invention. FIGURE 1 discloses a block diagram of a logging system capable of practicing applicants' improved chlorine logging operation. Although the over-all invention can be practiced with various combinations of conventional components, it is preferable to employ the invention with the component combination shown in FIGURE 1. The downhole components shown in FIGURE 1 include a novel pulse height analyzer circuit 1 electrically connected by representative conductor 3 to a conventional photomultiplier tube 5. Tube 5 views scintillation crystal 7 and is powered by high voltage generator 9 and regulator 11. Voltage divider system 13 is connected to high voltage generator 9 and to other conventional low voltage elements not shown for purposes of simplification. The uphole conventional components of the system include amplifier 15 connected between discriminator 17 and count rate meter and recorder 19 and amplifier 21 connected between discriminator 23 and count rate meter and recorder 25. The recorders are driven by a single recorder drive 27. Constant current generator 29 and discriminators 17 and 23 are shown connected to slip rings 31. Multiconductor cable 33 contains conductor 35 connecting discriminators 17 and 23 to pulse height analyzer 1. Conductors 37 and 39 are connected between generator 29 and voltage divider 13. If desired, conductor 39 can be connected through the shield of cable 33 as shown. Cable 33 may be wound or unwound from a conventional logging drum (not shown) to raise or lower the logging sonde (not shown) containing the downhole components shown in FIGURE 1.

Figure 2:
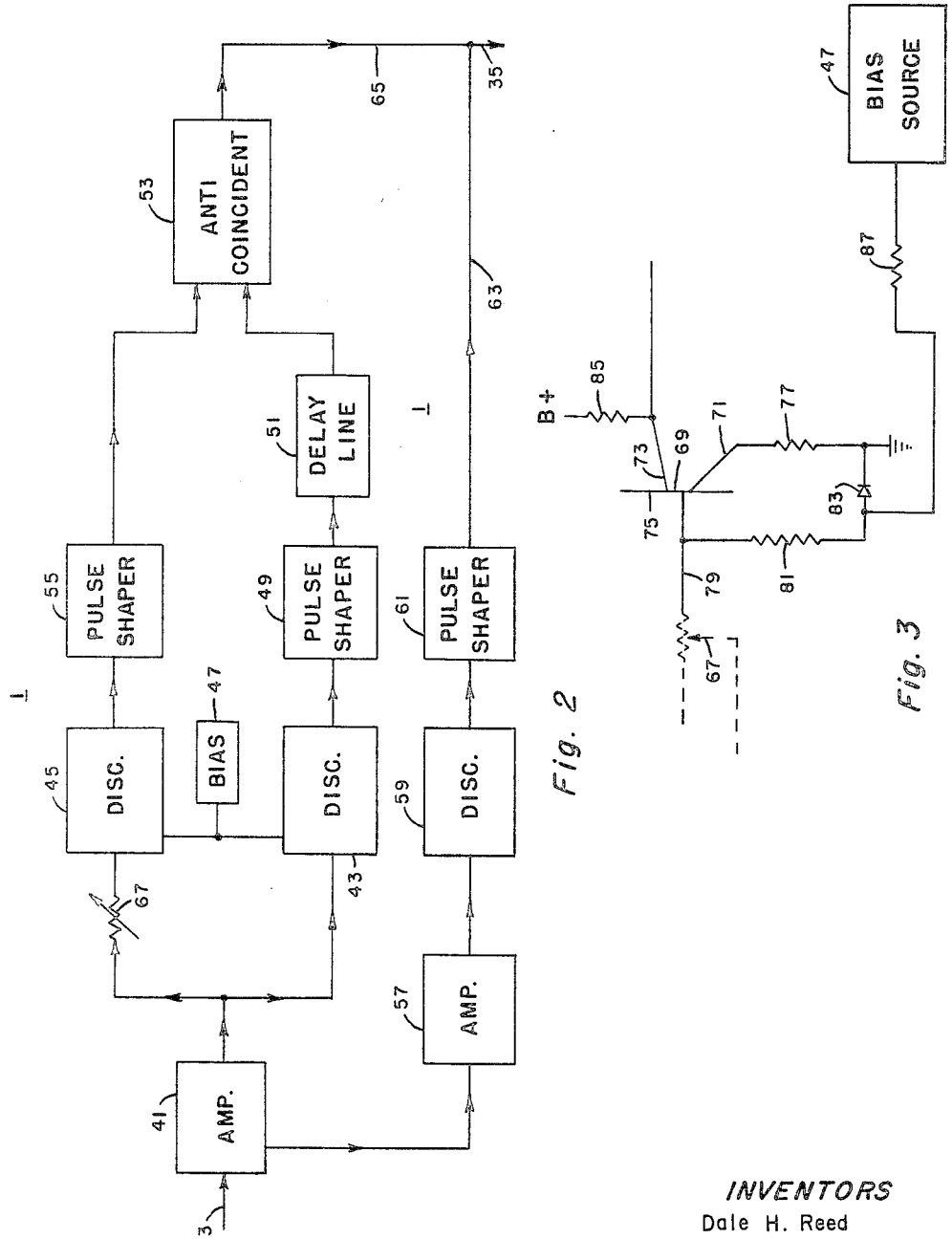
FIGURE 2 shows a block diagram of the novel pulse height analyzer.

FIGURE 2 shows a block diagram of the novel pulse height analyzer 1 shown in FIGURE 1. Pulse height analyzer 1 includes a high energy gamma (chlorine) signal differential discriminator section and a low energy gamma (neutron) signal discriminator section. The chlorine signal discriminator section includes amplifier 41 connected in parallel to discriminators 43 and 45, bias source 47 connected in parallel to discriminator 43 and discriminator 45, discriminator 43 connected serially to pulse shaper 49, delay line 51 and anticoincident circuit 53 and discriminator 45 serially connected to pulse shaper 55 and anticoincident circuit 53. The neutron signal discriminator section includes amplifier 57 serially connected to discriminator 59 and pulse shaper 61. Output conductor 63 from 61 and output conductor 65 from 53 are connected in parallel to conductors 35 in cable 33. Pulse height analyzer input 3 is shown connected through a portion of block 41 to amplifier 57. However, if desired, input 3 can be connected in parallel to 41 and 57. Rheostat 67 can be utilized as shown or incorporated in discriminator circuit 45. This rheostat is utilized in conjunction with the gain of amplifier 41 and the design value of bias 47 to determine the upper voltage limit for the chlorine spectrum. The lower threshold voltage is determined by the gain of amplifier 41 and bias 47. The lower threshold voltage for the neutron spectrum is determined by a bias source within discriminator circuit 59 and the gain of amplifier 57.

In operation, amplifier 41 receives voltage pulses on input 3 from photomultiplier tube 5, FIGURE 1, and passes these pulses representing various prompt capture gamma ray energies to the chlorine signal discriminator circuit and to amplifier 57. As will be explained in detail hereinafter, threshold voltage of discriminator 43 is set to pass pulses representing energies of 5 mev. or more while the threshold voltage of discriminator 45 is set to pass pulses representing energies of 6.5 mev. or more. The threshold voltage of discriminator 59 is set to pass pulses representing energies of 2 mev. or more. If a pulse representative of a 6 mev. prompt capture gamma ray is received by amplifier 41, the pulse is simultaneously applied to discriminators 43, 45 and through amplifier 57 to discriminator 59. Because of the predetermined threshold voltages, discriminators 43 and 59 pass the pulse and discriminator 45 does not pass it. Pulse shaper 49 receives 43's output and amplifies it to a predetermined amplitude after which it is delayed by delay line 51 and applied to the input of anticoincident circuit 53. With only one pulse arriving at 53 the pulse is passed through the anticoincident circuit to output 65 as a negative going pulse of predetermined amplitude. See the chlorine pulse, FIGURE 1. A pulse representing the same gamma ray is simultaneously passed through discriminator 59 and pulse shaped 61 where it is amplified to a predetermined amplitude (one-half the amplitude of the pulse from 53). See neutron pulse, FIGURE 1. These two pulses of different amplitudes but representing the same energy are combined and set uphole on conductor 35. Uphole, the combined, large amplitude pulse is passed by discriminators 17 and 23, FIGURE 1, and recorded as part of the chlorine curve by recorder 19 and as part of the neutron curve by recorder 25. Discriminator 17 is biased to pass only large amplitude pulses while discriminators 23 is biased to accept the small amplitude pulses from 61, FIGURE 2, and the large amplitude pulses from 53.

If amplifier 41 receives a pulse representing slightly more than 6.5 mev., the pulse is passed by all of the downhole discriminators. The pulse passed by discriminator 45 is amplified to a predetermined amplitude and width by 55 and applied to the input of anticoincident circuit 53. The pulse passed through discriminator 43 is amplified to about the same predetermined amplitude but of opposite polarity and delayed by 51 so that it arrives at the input of 53 slightly after the leading edge of the pulse from 55. Since both pulses arrive at 53 at approximately the same time, no output is produced on conductor 65; however, a small amplitude pulse does appear on conductor 63 and is sent uphole on conductor 35. This pulse is produced by the original pulse passing through amplifier 57, discriminator 59 and pulse shaper 61. Since this is a small amplitude pulse, it is rejected by discriminator 17, FIGURE 1, but passed by discriminator 23 and recorded as part of the neutron curve by recorder 25. From the above, it is clear that pulses representing energy between 5.0 mev. and 6.5 mev. appear on conductor 65 as a negative going pulse of a predetermined amplitude and pulses representative of 2.0 mev. and above appear on conductor 63 as negative going pulses one-half the amplitude of the first pulse. If both pulses appear they are combined on conductor 35 as a single large amplitude pulse.

Figure 3:
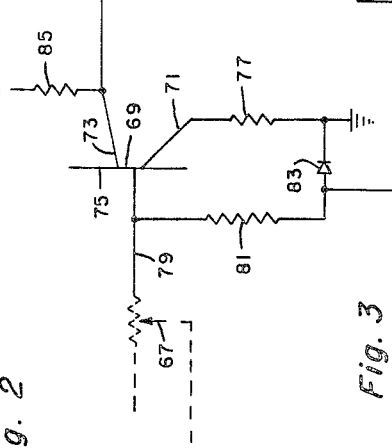
FIGURE 3 shows a circuit diagram of the preferred embodiment of the discriminators in FIGURE 2.

FIGURE 3 discloses the preferred embodiment of the novel discriminators utilized in pulse height analyzer 1, FIGURE 2. The discriminator includes transistor 69 with emitter 71, collector 73 and base 75. Emitter resistor 77 is connected between 71 and ground. Input conductor 79 is connected in parallel to base 75 and isolation resistor 81 which in turn is connected in series with Zener diode 84 to ground. Load resistor 85 is connected between B+ and 73. Bias voltage source 47 is connected through ballast resistor 87 to the anode of Zener diode 83.

By using the discriminators as arranged in FIGURE 2, the pulse height analyzer is able to operate directly on the photomultiplier output pulses without the requirement for stable high gain amplification. Since the photomultiplier tube's output voltages range from less than one volt to approximately four volts, most conventional discriminators used with the tube require stable high gain amplification and those that do not require such preamplification are much more complex than the discriminators shown. By using a back biased transistor-type amplifier stage with negative feedback, FIGURE 3, as a discriminator, low level discrimination is practiced and sufficient voltage gain is produced within the stage to maintain stable thresholds throughout the pulse height analyzer. Being more specific, the pulse shaping circuits 49, 55, and 61 following their respective discriminator circuits in FIGURE 2 commonly have a 0.1 volt variation in trigger level as a result of temperature changes that occur during downhole operations. Therefore, if only a 0.01 volt variation is allowed in the discriminator levels, it is necessary to amplify their input signals by a factor of 10 to insure that the allowable small signal variations passed by the discriminators have sufficient amplitude to overcome threshold variations encountered in the remaining portions of the pulse height analyzer that are sensitive to temperature variations. The improved and simplified discriminator shown in FIGURE 3 develops this necessary gain within the discriminator stage instead of resorting to the conventional solution of making a preceding amplifier (41 or 57, FIGURE 2) a complicated circuit designed to produce the necessary stable high gain amplification.

In operation, transistor 69 is normally biased to cut off by an accurate stable voltage developed by source 47. In the preferred embodiment, 47 is a constant current generator 29 and voltage divider 13, FIGURE 1, adapted to produce a negative 15 volts which is applied across ballast resistor 87 to the anode of Zener diode 83. A bias of approximately —6 volts is applied to transistor base 75. This bias voltage which can be varied as desired is the effective threshold voltage of the discriminator. As will be detailed in the calibration steps discussed hereinafter, preceding amplifier stage 41 or 57, FIGURE 2, is varied until its amplification factor causes the minimum desired voltage pulse to overcome this threshold voltage. Assuming that a 1.92 volt pulse represents a 5 mev. capture gamma ray, the amplification factor of 41 is varied until this pulse overcomes the —6 volt bias applied to base 75, FIGURE 3, and the portion exceeding 6 volts is passed. More specifically, let use assume that in the preferred embodiment the necessary amplification factor of 41 is approximately 3. This means that the 5 mev. energy represented as a voltage pulse of 1.92 must be amplified to a voltage of approximately 6.01 volts before it is passed through the discriminator. The pulse shaping circuit, such as 55, FIGURE 2, exhibits a .15 volt threshold voltage which is subject to .05 volt variation due to temperature changes, i.e., the pulse shaper may trigger on .10 volt one time and .20 volt the next instance. By having a gain of ten or more in the discriminator circuit, the error produced by such changes in threshold voltage is minimized.

If it is desirable to establish an upper voltage limit on the discriminator as in 45, FIGURE 2, an attenuating component such as variable resistor 67 can be utilized. Thus, variable resistor 67 is set to attenuate all undesired voltages so that only voltages above a predetermined level exceed the bias and are passed by the discriminator. If it is desirable to make the discriminator part of a circuit, such as shown in FIGURE 2, but capable of viewing various predetermined windows, the bias applied to the base of the discriminator can be varied to the desired predetermined voltage. For instance, bias source 47, FIGURE 2, can be made to vary to the desired predetermined voltages. If it is undesirable to vary the voltage source a switch and a bank of parallel, different sized Zener diodes can be utilized. One example of the latter embodiment includes a rotary switch which selectively connects a Zener diode of a size to produce the necessary bias voltage on transistor base 75, FIGURE 3.

The improved calibration method provides for the establishment of a test environment which can be accurately and speedily reproduced whenever and whereever the equipment is to be calibrated. Heretofore, logging systems have been calibrated by placing their source and detector in a portable test jacket or barrel to produce the test environment. This is unsatisfactory since external influences such as the earth, the logging truck, etc., prevent developing a reproducible number of gamma rays and a reproducible energy spectrum which is necessary in a calibrating operation. In the improved method the test environment is established by placing adjacent the crystal a test source of known strength with a gamma ray energy spectrum which changes rapidly with gamma ray energy level in a predetermined energy range. It is necessary to use a test source with a gamma ray emission spectrum which changes rapidly with energy in a predetermined energy range in order to make precise, unambiguous window settings on the pulse height analyzer. That is, when the test source provides a large change in count rate with a small change in window position and/or width, the windows on the pulse height analyzer can be calibrated with great accuracy. A radium button of a few microcuries strength to establish a 2 mev. threshold is suitable as such a test source. Other test sources such as a thorium button of a few microcuries strength to establish a threshold of approximately 2.6 mev. can be used. In any event, the test source must always be placed in the exact same physical position on the detector, with the same side of the test source toward the detector each time the system is calibrated. The test source can be placed directly on the crystal or can be placed on the outside portion of the sonde overlying the crystal (if the crystal and photomultiplier tube are positioned in the sonde). However, with either test source position it is essential to establish the exact test source position relative to the crystal detector by suitable markings on the crystal or the sonde so that the same physical relationship can be established each time the particular calibration is made. This insures that the same calibration environment is developed each time a particular type of calibration is made. It should be noted that when the test source is placed on the sonde all components between the sonde and the crystal must be marked so that they can also be made to assume the same repeatable physical relationships to the source and the crystal. In addition, it should be noted that a stronger test source is used when it is placed on the sonde. Normally, approximately 20 microcuries is required on the sonde.

Let us now briefly consider the improved calibration method in its entirety. Preliminary preparations must be made before field calibrations can be run. That is, the crystal and the test source must be calibrated in the laboratory to provide a basis for field calibrations. The radium button or other test source to be used is set in a precise, easily repeated position on the crystal, or the sonde, and this position is accurately marked on the crystal, or the sonde. Next the exact count rate per minute above the desired energy threshold produced by this precise test source-crystal arrangement is accurately determined using a precise, laboratory, multi-channel pulse height analyzer such as an ND 120 made by Nuclear Data Co. of Madison, Wisconsin. Of course, the analyzer is previously conventionally calibrated using several gamma ray sources of different, known energies. For purposes of illustration assume that the count rate due to the radium source is determined to be y c.p.m.

Once preliminary calibration is completed, the logging apparatus is carried to the field and readied for use. The crystal plus photomultiplier detector assembly should be maintained at a stable temperature of between 80 degrees Fahrenheit and 100 degrees Fahrenheit for several hours prior to and during calibration. Also, it is desirable that the photomultiplier be energized by a high voltage source for an hour or more prior to logging. This is necessary because photomultiplier tube are quite variable in the time required to reach a stable operating condition. Once energized, the photomultiplier should not unnecessarily be exposed to light.

Resolution of the detector system can be checked for proper performance as follows: A source of essentially monoenergetic gamma rays, e.g., cesium which emits a 0.661 mev. gamma ray, is placed near the detector. The output of the photomultiplier is connected to an oscilloscope. If the resolution is good, a rather well defined pulse can be seen. If the resolution is poor, the pulses will form a solid envelope. Poor resolution indicates that the crystal is damaged, discolored, or improperly mounted on the photomultiplier tube.

The next step is to adjust the logging tool pulse height analyzer so that it passes pulses representing the energy ranges desired to be logged. This can be done by connecting a variable pulse source such as pulse generator 155, FIGURE 4, through an accurate potentiometer calibration network 157 to input 3 of pulse height analyzer 1. The calibration network taps, 3.25x, 2.5x and x, insure that accurate, desired relationships are established between the generator pulses used to calibrate the pulse height analyzer. Of course, other suitable relationships can be developed depending on the particular pulse height analyzer and the purpose for which it is to be used. The way the discriminators in the particular pulse height analyzer are adjusted will depend upon the type of pulse height analyzer used. With regard to the pulse height analyzer illustrated in FIGURE 2, only the gain of amplifiers 41 and 57 need be checked for lower level neutron discrimination and lower level chlorine discrimination and only variable resistor 67 need be checked for upper level chlorine discrimination. This is true since the predetermined bias voltages developed by Zener diode 89 in neutron discriminator 59 and by Zener diode 83 connected to chlorine discriminator 45 are accurate and stable.

Looking at the adjustment of the pulse height analyzer with 155 and 157, FIGURE 4, in more detail, the pulse amplitude developed at tap 3.25x of calibration network 157 is set to approximately 2.5 volts using the coarse amplitude adjustment which is part of conventional pulse generator 155. This 2.5 volt pulse amplitude has been determined to be a suitable level for the illustrated pulse height analyzer; however, this level may vary according to the particular type of pulse height analyzer used. In any event, it is not necessary for the pulse amplitude at the tap to be precisely determined. The pulse height analyzer is then connected through plug 159 to tap x of network 157. Amplifier 57, FIGURE 2, is adjusted until the pulses of amplitude x (approximately 0.77 volt) are just capable of passing through neutron discriminator 59 with sufficient amplitude to trigger pulse shaper 61. That is, the amplifier gain of 57 is adjusted until counting starts on recorder 25, FIGURE 1. It should be noted at this time that the fine amplitude adjustment 161 is always set to a precise, reproducible reference position. It is now moved slightly to increase the pulse amplitude very slightly. All of the pulses should now pass through the neutron discriminator and further increases in pulse amplitude should have no effect. The fine amplitude adjustment is then moved slightly beyond the reference position producing pulses very slightly reduced in amplitude. The neutron discriminator is now properly adjusted if it does not pass these pulses.

Fine amplitude adjustment 161 is returned to its reference position and plug 159 is moved to tap 2.5x. Amplifier 41, FIGURE 2, is adjusted until the pulses of amplitude 2.5x (approximately 1.92 volts) from 157 are just capable of passing through lower chlorine discriminator 43, triggering pulse shaper 49 and being counted on recorder 19, FIGURE 1. Fine gain adjustment 161, FIGURE 4, is again used to insure that the discrimination is very sharp. This is done in the same manner as described above. After this is accomplished, the threshold for the chlorine window is properly adjusted.

With the fine amplitude adjustment 161 in the reference position and 159 in tap 3.25x, pulses will be passing through discriminator 43 and pulse shaper 49 and up to anticoincident circuit 53. Next variable resistor 67, FIGURE 2, is adjusted until pulses from tap 3.25x (approximately 2.5 volts) are just capable of passing through upper chlorine discriminator 45, triggering pulse shaper 55, actuating the anticoincident circuit 53, and therefore preventing the pulses from pulse shaper 49 being counted on recorder 19, FIGURE 1. Now when fine amplitude adjustment 161 is used to slightly increase the pulse amplitude, all of the pulses should pass through upper chlorine discriminator 45 as well as through lower chlorine discriminator 43 and anticoincident circuit 53, FIG- URE 1, will completely eliminate counting on recorder 19, FIGURE 1. Fine gain adjustment 161 is moved just beyond its reference position to produce pulses slightly decreased in amplitude. At this setting, the pulses should not pass through 45, FIGURE 2, but all should still pass through 43. Therefore, all of the pulses are counted by recorder 19, FIGURE 1. Further moderate decreases in pulse amplitude should not change the chlorine response recorded by 19. Now the upper discrimination of the chlorine window is properly set. Before proceeding, however, it is desirable to recheck all three discriminators to see that the adjustment of one has not adversely affected the adjustments of the others. This recheck can be done by repeating the steps described above.

Next the gain of the photomultiplier circuit, FIGURE 4, must be adjusted so that the output pulse from the photomultiplier should just barely register counts on the neutron curve in response to a 2 mev. gamma ray, i.e., pulse height should be about x volts. Since there is not a convenient source of 2 mev. gamma rays, the counts per minute above 2 mev. from a given test source is measured. With this test source in place in the field, the photomultiplier gain can be adjusted until the neutron curve count rate is equal to the known counts per minute above 2 mev. It has been found that approximately 0.385 volt per mev. is a satisfactory photomultiplier output voltage-mev. relationship for the illustrated pulse height analyzer. The photomultiplier adjustment is made by adjusting the gain of the photomultiplier circuit until the neutron curve count rate, recorder 25, FIGURE 1, registers y counts per minute above background with the radium test source 163, FIGURE 4, at its precise physical location relative to detector crystal 7 as described heretofore. The photomultiplier gain can be varied by adjusting the anode resistor, schematically represented as 165. After adjusting the gain of the photomultiplier tube, the counts per minute should be recorded for about half an hour to be sure the photomultiplier has stabilized. If the neutron count rate is within a few percent of y, then the neutron curve threshold energy is accurately set at 2 mev. and the chlorine energy window is accurately set to the 5–6.5 mev. window. "Background count rate" is determined by measuring crystal response with the radium button moved several feet away. It follows that we seek a count rate that is equal to the measured count rate minus the background count rate. This correction for background may be negligible under most circumstances.

After the detector and the pulse height analyzer have been calibrated as defined above, they are placed in a logging sonde housing 167, FIGURE 5. Although it is not mandatory, it is highly desirable to repeat the calibration method described above with the components in the sonde housing. Normally no adjustment would be required. FIGURE 5 shows test source 169 positioned at its appropriately marked test position on sonde housing 167. As discussed heretofore, it is extremely important in creating the test environment to place the test source in its properly marked position, and to utilize other suitable markings or means to insure that crystal 7 is always placed in an exact repeatable physical relationship with the test source on the sonde. It is also essential to insure that the intervening components such as vacuum bottle 171, cooling jacket 173 and photomultiplier tube 5' which is normally accompanied by a housing means and magnetic shield, all represented as 5', are made to assume the same repeatable geometry. That is, these elements should be positioned in a manner so that the center of crystal 7 is always in line with and in the same physical relationship with the center of the test source, and that the exact same portions of the intervening components are in line with these centers. The neutron source used in logging should be well removed from the sonde during calibration to keep the background count rate low. If only one calibration is to be made, it is preferable to calibrate when the components are outside the sonde housing since this insures that the source can always be positioned in exactly the same spot.

Before the well is logged, a short check log should be run in a fairly shallow section, which is preferably centered about the bottom of the surface casing, i.e., half the log is made where the surface casing around the well is and half is made below the bottom of the surface casing. When logging operations are complete, this same test section is rerun using the same instrument settings, i.e., sensitivity, etc. Any drift in instrument response during logging should then be readily apparent. If the test sections do not correspond, another log can be run on the well while all the equipment is assembled. Therefore, this check procedure is most important as a prompt means for establishing log validity.

Another method for determining whether the well has been properly logged is to recheck the photomultiplier adjustment. This is done in precisely the same manner as the photomultiplier-calibration which was performed prior to the logging operations. The same test source is positioned exactly the same way and on the same spot of the crystal as before. It follows, therefore, that the measured count rate should be substantially the same as before. A significant difference in count rate indicates photomultiplier instability and change in calibration during logging. No change indicates that a valid log has been obtained.

By way of summary, the present invention must be distinguished from instances were the art shows that a secondary source is placed adjacent a scintillation crystal. In such situations, the energy level of secondary source is measured where the gamma ray spectrum exhibits a maxiumum (i.e., has little slope) rather than where the spectrum changes rapidly with the energy level (has a slope). In many applications, as in the cited example, a well defined peak in a gamma ray spectrum may not be available at precisely the desired energy. But it is quite likely one can find a suitable gamma ray spectrum that exhibits a large slope at the desired energy. This difference is fundamental and because of the fact that applicants can measure along a slope, the presently disclosed novel calibration methods were practical. A further advantage is that applicants' technique provides a more sensitive test of proper calibration and one that is more suitable for field use.

Another distinction over the art should be emphasized again is the third method of always placing the test source or secondary source in exactly the same position on the crystal. Reproducibility is absolutely essential in order to carry out the presently disclosed calibration process. Such geometrical reproducibility is not necessary in the prior art.

Although only the preferred embodiments have been described in detail, numerous other modifications can be made in accordance with the spirit of this invention. Therefore, it should be understood that this invention is not limited to the specifically disclosed methods and apparatus but is only limited in accordance with the appended claims.

We claim:
1. A method for calibrating a chlorine logging system including a detector system having a crystal capable of scintillating in response to gamma rays and a photomultiplier capable of converting said scintillations into electrical pulses comprising
   (a) placing a test source whose gamma ray energy spectrum changes rapidly with energy level in a predetermined energy range adjacent said crystal in a precise and easily reproducible position thereto,
   (b) establishing a reference count rate by measuring the exact count rate of gamma rays above a predetermined energy level within said predetermined energy range for said test source,
   (c) prior to each logging operation placing said test source adjacent said crystal so that said source occupies exactly the same position and has exactly the same relation to said crystal as in (a) above, and
   (d) adjusting the output of said photomultiplier until the count rate measured in (b) above is duplicated.
2. A method in accordance with claim 1 wherein said test source is placed directly on said crystal.
3. A method for calibrating a chlorine logging system including a sonde housing a detector system having a crystal capable of scintillating in response to gamma rays and a photomultiplier capable of converting said scintillations into electrical pulses comprising
   (a) placing a test source whose gamma ray energy spectrum changes rapidly with energy level at 2.0 mev. directly on said crystal in a precise and easily reproducible position,
   (b) establishing a reference count rate by measuring the exact count rate of gamma rays above 2.0 mev. for said test source,
   (c) prior to each logging operation placing said test source directly on said crystal so that said source occupies exactly the same position and has exactly the same relation to said crystal as in (a) above, and
   (d) adjusting the output of said photomultiplier until the count rate measured in (b) above is duplicated.
4. A method in accordance with claim 3 wherein an initial calibration is made placing said test source directly on said crystal and a final calibration is made placing said test source on the outside portion of said sonde overlying said crystal.
5. A method in accordance with claim 3 wherein the source of gamma ray energy is radium.

References Cited
UNITED STATES PATENTS

| | | | |
|---|---|---|---|
| 2,956,165 | 10/1960 | Johnson | 250—71.5 X |
| 3,122,636 | 2/1964 | Fryer | 250—83 |
| 3,229,090 | 1/1966 | Eberline | 250—83 |
| 3,264,475 | 8/1966 | Reed et al. | 250—71.5 |

ARCHIE R. BORCHELT, *Primary Examiner.*